(12) United States Patent
Chang et al.

(10) Patent No.: US 9,614,254 B2
(45) Date of Patent: Apr. 4, 2017

(54) SAFETY DEVICE FOR PREVENTING OVERCHARGE AND SECONDARY BATTERY THEREWITH

(75) Inventors: Sung Kyun Chang, Daejeon (KR); Jae Hyun Lee, Daejeon (KR); Joon Hwan Lee, Daejeon (KR); Soo Hyun Ha, Busan (KR); Jeong Ju Cho, Daejeon (KR)

(73) Assignee: LG Chem, Ltd. (KR)

( * ) Notice: Subject to any disclaimer, the term of this patent is extended or adjusted under 35 U.S.C. 154(b) by 1795 days.

(21) Appl. No.: 11/221,185

(22) Filed: Sep. 7, 2005

(65) Prior Publication Data

US 2006/0051660 A1    Mar. 9, 2006

(30) Foreign Application Priority Data

Sep. 7, 2004 (KR) .................. 10-2004-0071285

(51) Int. Cl.
*H01M 10/42* (2006.01)
*H01M 10/48* (2006.01)
(Continued)

(52) U.S. Cl.
CPC ......... *H01M 10/42* (2013.01); *H01M 10/425* (2013.01); *H01M 10/486* (2013.01); *H01M 10/623* (2015.04); *H01M 10/637* (2015.04); *H01M 10/052* (2013.01); *H01M 2200/00* (2013.01); *H01M 2200/10* (2013.01); *H01M 2200/101* (2013.01); *H01M 2200/106* (2013.01); *Y02T 10/7011* (2013.01)

(58) Field of Classification Search
CPC ............. H01M 10/425; H01M 10/486; H01M 10/5012; H01M 10/5026; H01M 2200/10; H01M 2200/201; H01M 2200/106; H01M 10/42; H01M 10/623; H01M 10/637; H01M 10/052; H01M 10/50; Y02T 10/7011
USPC ....................................... 429/122, 7
See application file for complete search history.

(56) References Cited

U.S. PATENT DOCUMENTS

| 4,315,237 A | * | 2/1982 | Middleman et al. ........ 338/22 R |
| 5,861,730 A | | 1/1999 | Lee ............................. 320/106 |

(Continued)

FOREIGN PATENT DOCUMENTS

| JP | 2002-033134 | 1/2002 |
| JP | 2003-284237 | 10/2003 |

(Continued)

OTHER PUBLICATIONS

Machine English Translation of JP 2002-033134.*
(Continued)

*Primary Examiner* — Stephen Yanchuk
(74) *Attorney, Agent, or Firm* — Lerner, David, Littenberg, Krumholz & Mentlik, LLP

(57) ABSTRACT

Disclosed are a safety device and a secondary battery using the same. The safety device includes a voltage sensitive heating device generating heat when a voltage difference between both ends thereof exceeds a predetermined voltage level and a temperature sensitive device having a reversible current ON/OFF function according to a temperature. The temperature sensitive device is coupled with the voltage sensitive heating device such that the temperature sensitive device detects the heat generated from the voltage sensitive heating device.

13 Claims, 5 Drawing Sheets

(51) Int. Cl.
*H01M 10/637* (2014.01)
*H01M 10/623* (2014.01)
H01M 10/052 (2010.01)

(56) References Cited

U.S. PATENT DOCUMENTS

| | | | |
|---|---|---|---|
| 6,060,185 A * | 5/2000 | Okutoh | 429/7 |
| 6,531,847 B1 | 3/2003 | Tsukamoto et al. | 320/135 |
| 2003/0044689 A1* | 3/2003 | Miyazaki | H02J 7/0026 |
| | | | 429/320 |
| 2004/0257046 A1* | 12/2004 | Morimoto et al. | 320/134 |

FOREIGN PATENT DOCUMENTS

| | | |
|---|---|---|
| KR | 1020050094324 A | 9/2005 |
| WO | 99/39400 | 8/1999 |
| WO | 00/59094 A3 | 10/2000 |
| WO | 02091398 A2 | 11/2002 |
| WO | 03032459 A1 | 4/2003 |

OTHER PUBLICATIONS

Korean Intellectual Property Office, International Search Report dated Dec. 13, 2005.
Supplementary European Search Report for Application No. 05808748.7-1277/1787339; Dated Jun. 16, 2009.

* cited by examiner (A)

(B)

(A)    (B)

SAFETY DEVICE FOR PREVENTING OVERCHARGE AND SECONDARY BATTERY THEREWITH

This application claims the benefit of the filing date of Korean Patent Application No. 2004-71285, filed on Sep. 7, 2004, in the Korean Intellectual Property Office, the disclosure of which is incorporated herein in its entirety by reference.

BACKGROUND OF THE INVENTION

Field of the Invention

The present invention relates to a safety device having a simple structure for protecting a secondary battery from overcharge, over-voltage, over-current and over-heat.

Description of the Prior Art

Secondary batteries are rechargeable batteries including Ni—Cd batteries, Ni-MH batteries, and lithium ion batteries. Recently, as the lithium ion batteries have been spotlighted, studies and research have been actively carried out in relation to the lithium ion batteries. This is because the lithium ion batteries have advantages in that they have an energy density higher than that of the Ni—Cd batteries or the Ni-MH batteries. The lithium ion battery can be fabricated in a compact size with a light weight, so the lithium ion battery can be effectively utilized as a power source for portable electronic appliances, such as portable phones, camcorders or notebook computers. In addition, the lithium ion battery is extensively used as a power source for an electric vehicle, so the lithium ion battery has been currently spotlighted as a next-generation energy storage medium.

Although the lithium ion batteries have the above advantages, the lithium ion batteries present disadvantages that they are vulnerable to overcharge. If a secondary battery is not equipped with a safety device, accidental ignition or explosion of the secondary battery may occur due to the overcharge, thereby causing a dangerous accident or property loss. Therefore, it is very important for the secondary battery to prevent or restrict the overcharge or to solve problems derived from the overcharge.

For instance, when the lithium ion battery is subject to the overcharge, a negative reaction may increasingly occur between a cathode active material (e.g., $LiCoO_2$) and an electrolyte of the lithium ion battery. Such a negative reaction destroys the structure of the cathode active material while causing an oxidation reaction of the electrolyte. In the meantime, lithium can be deposited on an anode active material consisting of graphite, etc. If the voltage applied to the secondary battery continuously rises even if the secondary battery has been overcharged, accidental ignition or explosion of the secondary battery may occur.

The above problem may become serious if the secondary battery is connected to a high voltage power source. For instance, if the lithium ion secondary battery is connected to a power source for a vehicle, 12V is applied in cases of automobiles, and 24V is applied in cases of freight cars because two power sources of 12V are connected in series. In this case, if an excessive voltage deviating from the standard for the secondary battery is suddenly applied to the secondary battery, a dangerous accident may occur, so that it is necessary to provide a safety device capable of effectively protecting the secondary battery from the excessive voltage.

For instance, Japanese Patent Unexamined Publication No. 2003-284237 discloses a safety device for a secondary battery including a zener diode and a thermal fuse thermally bonded to the zener diode. According to the above secondary battery having the above safety device, current flowing toward the zener diode suddenly increases when the secondary battery is subject to the over-charge voltage, so that power consumption of the zener diode is suddenly increased, thereby generating heat. As the zener diode generates heat, the thermal fuse connected to the zener diode is irreversibly cut off, thereby shutting off the current being applied to the secondary battery. According to Japanese Patent Unexamined Publication No. 2003-284237, the breakdown voltage of the zener diode is employed in order to disconnect the thermal fuse when the secondary battery is subject to the over-charge voltage. However, if the breakdown voltage of the zener diode is slightly higher than a maximum charge voltage of the secondary battery, the zener diode may have the leakage current when the secondary battery is normally operated although the overcharge of the secondary battery can be prevented.

It is generally known in the art that the zener diode has the leakage current under a predetermined voltage lower than the breakdown voltage of the zener diode by 1V or less. Thus, if the leakage current is generated from elements connected to the cathode and the anode of the secondary battery, the secondary battery may be self-discharged, so that the operating time and lifetime of the secondary battery may be reduced after the secondary battery has been charged.

If a zener diode, which does not cause the leakage current under the charge voltage of the secondary battery, is used for the secondary battery, the current cannot be sufficiently discharged when the secondary battery is subject to the overcharge. In addition, when a high current is applied to the zener diode, the zener diode is broken so that the zener diode may not play its original role. Even if the voltage rises, the resistance is so high that the current cannot flow through the zener diode.

SUMMARY OF THE INVENTION

A temperature sensitive device, such as a PTC device, having a reversible current ON/OFF function according to the temperature is operated when the temperature rises above a predetermined temperature. Thus, the temperature sensitive device is operated only when the secondary battery is over-heated to a predetermined temperature level even if the secondary battery is subject to the overcharge. Accordingly, the temperature sensitive device may be operated after the secondary battery has been damaged due to thermal impact applied thereto.

In order to solve the above problem, the present invention provides a temperature sensitive device operated by means of heat generated from a voltage sensitive heating device, which generates the heat when a voltage difference between both ends thereof reaches a predetermined voltage level (e.g., the overcharge voltage), in such a manner that the current is shut off before the secondary battery is subject to the over-heat, thereby preventing the secondary battery from being damaged or overcharged.

In addition, different from the prior art employing a constant-voltage device having a breakdown voltage similar to a standard charge voltage of the secondary battery, in order to prevent the secondary battery from being self-discharged due to the leakage current caused by the devices connected to a cathode and an anode of the secondary battery in a row, the present invention employs a voltage sensitive heating device capable of operating a temperature sensitive device, such as a PTC device, by using heat generated before the breakdown voltage when the secondary battery is subject to the overcharge. In this case, the voltage sensitive heating device connected to the cathode and the anode of the secondary battery in a row has the breakdown voltage significantly higher than the standard charge voltage of the secondary battery and the leakage current may not occur when the secondary battery is normally charged or discharged.

DETAILED DESCRIPTION OF THE PREFERRED EMBODIMENTS

Figure 1:
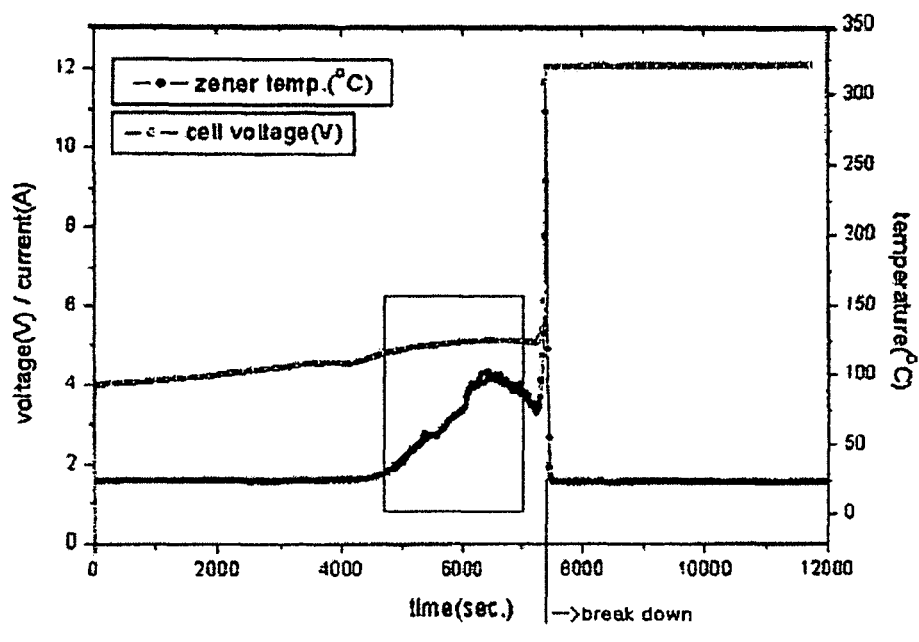
FIG. 1A is a graph illustrating temperature variation according to voltage variation when the constant current (1 ampere) is applied to a zener diode, which is a kind of voltage sensitive heating devices.
FIG. 1B is a graph illustrating the leakage current period and breakdown voltage period according to the voltage of a zener diode.
Figure 1:
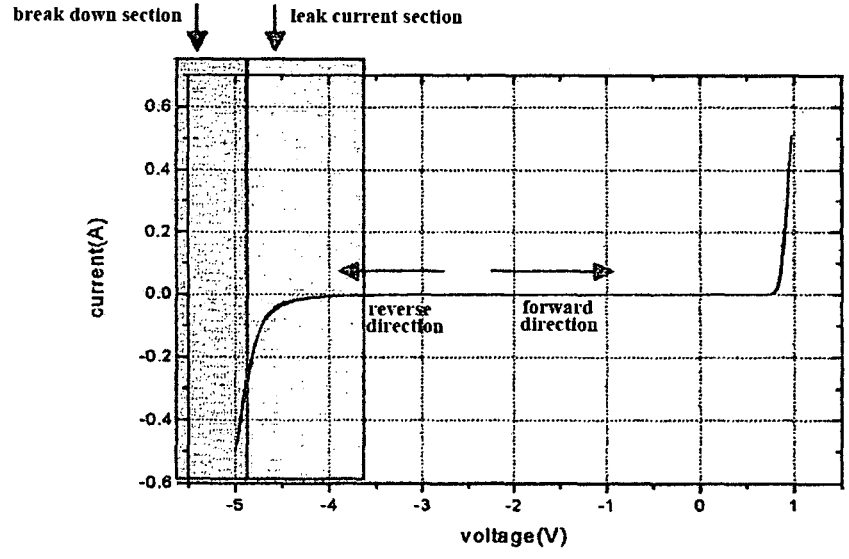

The present invention provides a safety device and a secondary battery having the same. The safety device includes a voltage sensitive heating device generating heat when a voltage difference between both ends thereof exceeds a predetermined voltage level, and a temperature sensitive device having a reversible current ON/OFF function according to a temperature, wherein the temperature sensitive device is coupled with the voltage sensitive heating device such that the temperature sensitive device detects the heat generated from the voltage sensitive heating device.

According to the preferred embodiment of the present invention, the voltage sensitive heating device generates heat before a breakdown voltage thereof and the temperature sensitive device is operated by means of heat generated from the voltage sensitive heating device under a predetermined voltage lower than the breakdown voltage. At this time, the breakdown voltage of the voltage sensitive heating device is at least 15% higher than the predetermined voltage causing the voltage sensitive heating device to generate the heat for operating the temperature sensitive device. In addition, the predetermined voltage causing the voltage sensitive heating device to generate the heat for operating the temperature sensitive device is higher than a maximum standard voltage of electric and/or electronic appliances equipped with the safety device and lower than a breakdown voltage for the electric and/or electronic appliances.

In the meantime, a value of leakage current of the voltage sensitive heating device obtained for one hour is preferably less than 0.05% of battery capacity (mAh). If the value of leakage current is less than 0.05% of battery capacity (mAh) under the full charge voltage of the secondary battery, the leakage current can be disregarded within the usage voltage range of the secondary battery.

Reference will now be made in detail to the preferred embodiments of the present invention.

According to the present invention, a voltage sensitive heating device, which generates heat when a voltage difference between both ends thereof reaches a predetermined voltage level and thus the current flows therethrough, is thermo-conductively coupled with a temperature sensitive device having a reversible current ON/OFF function in such a manner that the temperature sensitive device can detect the heat generated from the voltage sensitive heating device. So the heat generated from the voltage sensitive heating device is directly transferred to the temperature sensitive device, so that the current applied to the temperature sensitive device is shut off. Preferably, the voltage sensitive heating device physically makes contact with the temperature sensitive device.

Therefore, the safety device according to the present invention may represent superior safety characteristics even if the voltage sensitive heating device, such as a constant-voltage device with low capacity is applied to the safety device.

If the safety device having the voltage sensitive heating device and the temperature sensitive device according to the present invention is used for electric and/or electronic appliances, such as a secondary battery, the electric and/or electronic appliances can be prevented from being subject to the overcharge or over-voltage.

In the safety device according to the present invention, the voltage sensitive heating device is connected to terminals (cathode and anode) of the secondary battery in a row and the temperature sensitive device is connected to the terminal of the secondary battery in series or in a row (preferably, in series). For instance, when the safety device according to the present invention is coupled with the secondary battery, the voltage sensitive heating device is connected between the cathode and the anode of the secondary battery in a row and the temperature sensitive device is connected to the cathode or the anode of the secondary battery in series.

The present invention does not limit the materials for the temperature sensitive device if they have the reversible current ON/OFF function. Preferably, the temperature sensitive device shuts off the current when the temperature exceeds a predetermined temperature.

The temperature sensitive device includes, but not exclusively, a PTC (positive temperature coefficient) device or a bimetal.

The PTC device is a protective device having positive temperature coefficient characteristics. If the temperature of the PTC rises due to the over-current, an external short circuit or the overcharge when the PTC is connected to the terminal of the secondary battery in series, resistance of the PTC is suddenly increased, thereby shutting off the current. Different from the thermal fuse, the PTC device is a reusable device.

The PTC device is classified into a ceramic PTC using $BaTiO_3$ based ceramic and a polymer PTC using polymer.

The polymer PTC is fabricated by using conductive carbon mixed with insulating resin such as polyolefin and presents the positive temperature coefficient characteristics in which the resistance value thereof increases as the temperature rises. The basic principle for resistance variation of the polymer PTC is that, in the normal state, carbon distributed in polymer forms a conductive path and specific resistance becomes lowered so that the current may easily flow. However, if the temperature of the PTC device rises due to the over-current, etc, the temperature of the PTC device exceeds the melting point of polymer so that the volume of polymer may significantly vary in a range of several tens of percentage thereof, thereby interrupting the conductive path of carbon, which is called a "trip phenomenon". Accordingly, the resistance is significantly increased, thereby shutting off the current. The ceramic PTC device causes the trip phenomenon in the vicinity of the Curie temperature.

Figure 3:
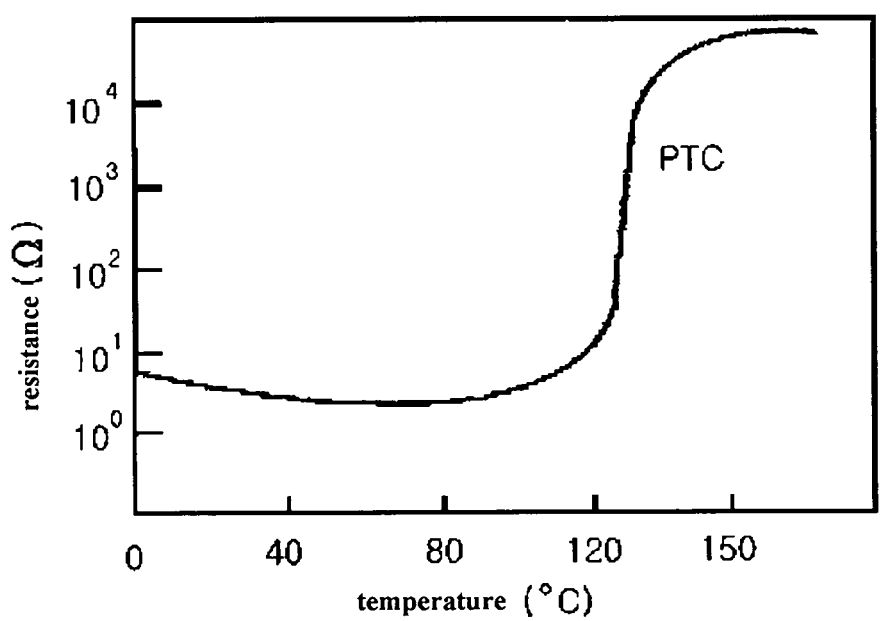
FIG. 3 is a graph illustrating resistance variation characteristics according to the temperature of a PTC device, which is a kind of temperature sensitive devices.

FIG. 3 is a graph illustrating resistance variation characteristics according to the temperature of the PTC device. Referring to FIG. 3, the resistance suddenly increases by $10^3$ times in the vicinity of the critical temperature of 120° C.

The voltage sensitive heating device according to the present invention includes, but not exclusively, a constant-voltage device such as a zener diode or a varistor. The present invention does not limit the type and standard for the voltage sensitive heating devices if they can generate heat when the voltage difference between both ends thereof exceeds a predetermined voltage level and cannot generate serious leakage current when they are connected to the terminals of the secondary battery in a row.

In general, the constant-voltage device signifies a device having characteristics of allowing a current to flow fast when a voltage exceeding a predetermined voltage level is applied to both ends thereof. Generally, the constant-voltage device, such as the zener diode or the varistor, is used as a bypass device for bypassing the current under the predetermined voltage condition.

The zener diode can be fabricated in the form of a semiconductor p-n junction diode. If a relatively high voltage is applied to the zener diode in the reverse direction thereof, the high current may be created under a specific voltage and the voltage is constantly maintained. This phenomenon is called "breakdown" and the voltage thereof is called a "breakdown voltage".

A zener voltage means a voltage applied to the zener diode when the current starts to flow in the reverse direction of the zener diode, that is, when the zener diode starts to operate. In general, the breakdown voltage is higher than the zener voltage.

In the meantime, the varistor is a non-linear semiconductor resistor, in which the resistance value of the varistor may vary depending on the voltage applied to both ends of the varistor. The varistor is an abbreviated form of "variable resistor".

Figure 2:
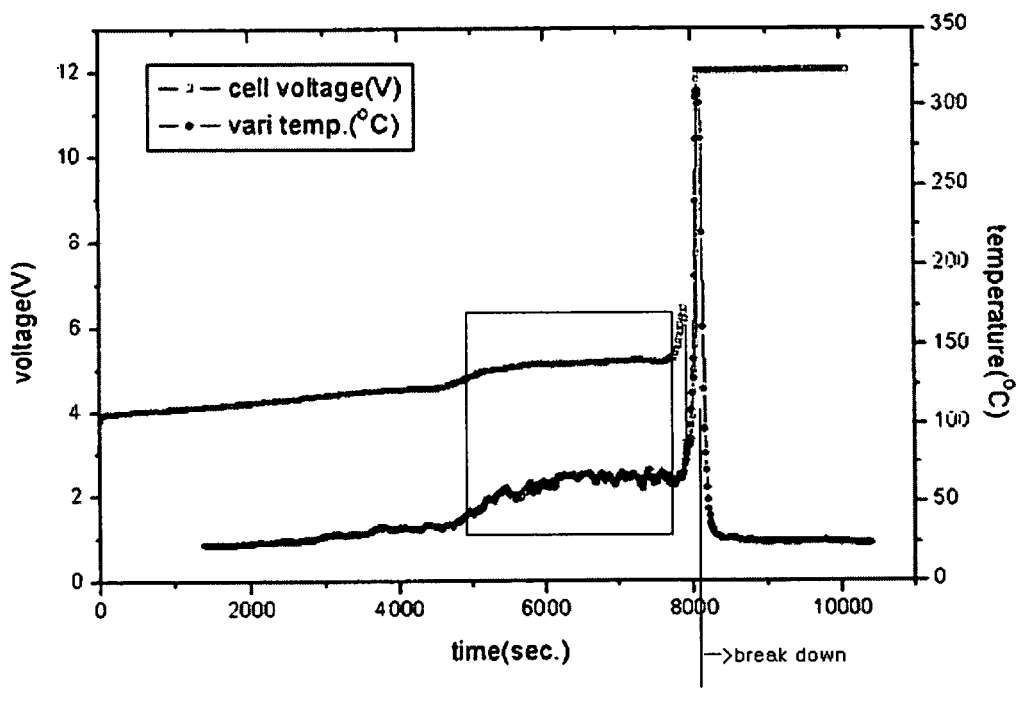
FIG. 2 is a graph illustrating temperature variation according to voltage variation when the constant current (1 ampere) is applied to a varistor, which is a kind of voltage sensitive heating devices.

FIGS. 1A and 1B are graphs illustrating temperature variation according to voltage variation when the constant current (1 ampere) is applied to the zener diode and FIG. 2 is a graph illustrating temperature variation according to voltage variation when the constant current (1 ampere) is applied to the varistor.

It can be understood from FIGS. 1 and 2 that the temperature suddenly rises in the vicinity of the breakdown voltage of the zener diode or the varistor, and a voltage section (shown in FIG. 1A as a rectangular box with a solid line) generating heat is represented before a breakdown voltage section.

According to the present invention, the temperature sensitive device, such as the PTC device, is operated by means of heat generated from the voltage sensitive heating device under the relatively low voltage below the breakdown voltage (that is, the heat generated in the voltage section shown in FIG. 1A as a rectangular box with a solid line), rather than being operated by means of heat derived from increased power consumption ($W=I^2R$, wherein W is power consumption, I is current and R is resistance) of the voltage sensitive heating device caused by the current flowing fast through the voltage sensitive heating device under the voltage above the breakdown voltage. In this case, the voltage sensitive heating device connected to the terminals of the secondary battery in a row has a breakdown voltage significantly higher than a full charge voltage of the secondary battery and the leakage current problem in the normal charge/discharge operations can be solved. The full charge voltage means a maximum value of the usage voltage of the secondary battery printed on the secondary battery by manufacturers.

Preferably, the voltage sensitive heating device has low capacity. This is because the heating device, such as a constant-voltage device having low capacity, has a short interval between a voltage causing the leakage current and a breakdown voltage causing the current to flow fast. Accordingly, the leakage current may occur from the voltage sensitive heating device just before the breakdown voltage causing the current to flow fast when the secondary battery is subject to the overcharge. Thus, the safety device of the present invention including the voltage-sensitive heating device capable of operating the temperature sensitive device under the relatively low voltage below the breakdown voltage can solve the leakage current problem incurred during the normal charge/discharge operation.

Constant-voltage devices having various breakdown voltages are available on the markets, so that those skilled in the art may selectively use the constant-voltage devices as the voltage-sensitive heating devices according to applications thereof.

Preferably, the breakdown voltage of the voltage sensitive heating device is lower than the explosion voltage or the ignition voltage of the secondary battery.

The safety device of the present invention can prevent the overcharge or over-voltage by shutting off the current upon the overcharge or over-voltage using the voltage sensitive heating device and the temperature sensitive device in coordination. In addition, due to the specific characteristic of each voltage sensitive heating device and temperature sensitive device, safety of electronic and/or electric appliances equipped with the voltage sensitive heating device and the temperature sensitive device can be ensured. For instance, the voltage sensitive device, such as the voltage-constant device (zener diode or varistor), is connected to the cathode and the anode of the secondary battery in a row, so that the discharge current flows fast while bypassing the current when the secondary battery is overcharged with a voltage above the breakdown voltage. Thus, the voltage can be lowered, thereby protecting the secondary battery from explosion or accidental ignition. In addition, the temperature sensitive device, such as the PTC device, is connected to the cathode and/or the anode of the secondary battery in series so as to shut off the current when the secondary battery is subject to the overcharge or over-current, thereby protecting the secondary battery. Therefore, the present invention can safely protect the secondary battery from the overcharge, over-voltage, over-current and over-heat by using the safety device having the simple and novel structure.

In the safety device according to the present invention, the voltage sensitive heating device and the temperature sensitive device may be reversibly operated. Accordingly, the safety device of the present invention is not a disposable device, but a reusable device.

The predetermined voltage causing the voltage sensitive heating device of the safety device to generate the heat for operating the temperature sensitive device may be properly selected from the voltage range above the maximum standard voltage of the electric and/or electronic appliances equipped with the safety device and below the breakdown voltage for the electric and/or electronic appliances.

If the safety device of the present invention is used for the secondary battery, the critical temperature of the temperature sensitive device is preferably in a range of 50 to 150° C., and the voltage sensitive heating device preferably generates heat under the voltage level of 4 to 5V to operate the temperature sensitive device. If the current is shut off at a temperature below 50° C. due to a sudden increase of resistance, the secondary battery may not be charged at the temperature range of −20 to 60° C., which is the usage temperature for the secondary battery. In addition, if the resistance suddenly increases at the temperature above 150° C., the secondary battery has already been damaged or deformed due to the high temperature, so that it is useless to shut off the current.

Hereinafter, the description will be made with regard to the operational relationship between the voltage sensitive heating device and the temperature sensitive device of the safety device according to the present invention. The voltage sensitive heating device is discharged when the voltage thereof rises above the full charge voltage of the secondary battery and operates the temperature sensitive device by using the heat generated when the voltage sensitive heating device is discharged. Accordingly, under the voltage causing the discharge and heat generation from the voltage sensitive heating device, that is, under the full charge voltage (e.g., 4-5V) of the secondary battery, the voltage sensitive heating device must generate heat such that it may raise the temperature of the temperature sensitive device up to the operational temperature of the temperature sensitive device, that is, above the critical temperature (e.g., 50 to 150° C., see, FIG. 4)

Accordingly, under the above voltage level, the voltage sensitive heating device preferably generates the heat until the temperature of the temperature sensitive device reaches the operational temperature thereof.

Figure 4:
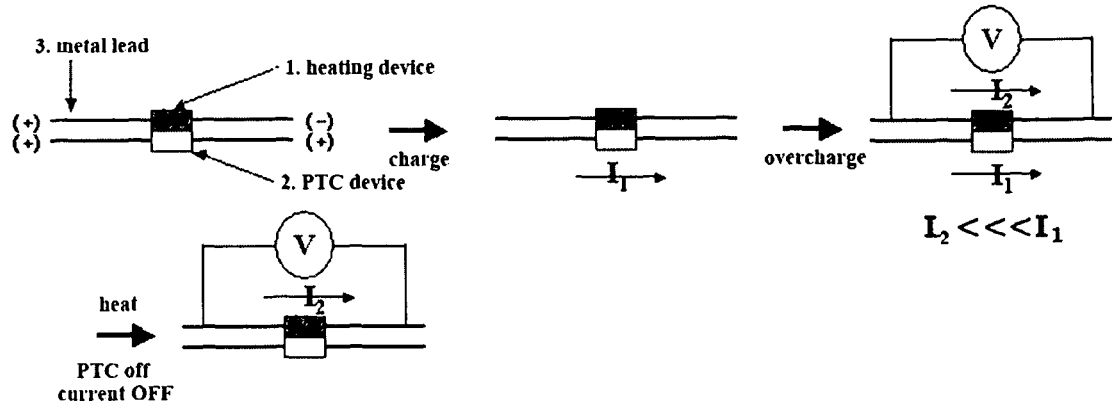
FIG. 4 is a schematic view illustrating the relationship and operational principle between a safety device and a secondary battery according to one embodiment of the present invention.

FIG. 4 is a schematic view illustrating the relationship between the safety device and the secondary battery according to one embodiment of the present invention. Hereinafter, the relationship between the voltage sensitive heating device and the temperature sensitive device shown in FIG. 4 and between the devices and the terminals (cathode and anode) of the secondary battery will be described. First, one lateral surface (bonding surface) of a heating device 1 is bonded to one lateral surface (bonding surface) of a PTC device 2. Since both ends of the heating device 1 detect the voltage of the secondary battery and perform the discharge operation if necessary, the heating device 1 is connected between a cathode terminal 11 and an anode terminal 12 of the secondary battery in a row through a metal lead 3. In addition, since the current being applied to the PTC device 2 is shut off when the temperature rises, the PTC device 2 is connected to a middle part of the cathode terminal 11 or the anode terminal 12 in series through the metal lead 3.

Figure 5:
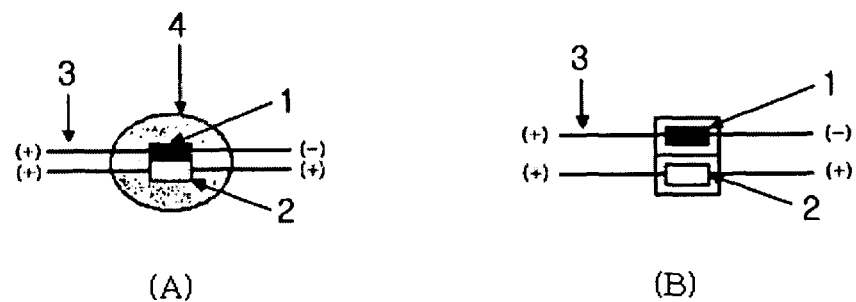
FIGS. 5A and 5B are schematic views illustrating a safety device shown in FIG. 4, in which an erosion/water resistant material is coated around the safety device.

FIG. 5A is a schematic view illustrating the safety device shown in FIG. 4, in which an erosion/water resistant material 4 is coated around the safety device. In this case, the heating device 1 is thermo-conductively coupled with the PTC device 2 in the erosion/water resistant material 4. Preferably, the heating device 1 physically makes contact with the PTC device 2. FIG. 5B is a schematic view illustrating the safety device, in which an erosion/water resistant material 4 is coated around the heating device and the PTC device, respectively, and one lateral surface (bonding surface) of the heating device is bonded to one lateral surface of the PTC device. In this case, the heating device is thermo-conductively coupled with the PTC device through the erosion/water resistant material. Preferably, the heating device physically makes contact with the PTC device. The coupling state between the devices shown in FIGS. 5A and 5B and the terminals of the secondary battery is identical to the coupling state between terminals of the secondary battery and the devices shown in FIG. 4.

The erosion/water resistant material can be coated around the heating device and the PTC device of the safety device after they are bonded to each other as shown in FIG. 5A, or the heating device and the PTC device of the safety device are bonded to each other after the erosion/water resistant material is coated around the heating device and the PTC device of the safety device, respectively, as shown in FIG. 5B.

FIGS. 6A and 6B are schematic views illustrating the relationship between the safety device and the secondary battery according to another embodiment of the present invention. Referring to FIG. 6A, one lateral surface (bonding surface) of the heating device 1 is bonded to one lateral surface (bonding surface) of the PTC device 2 through one metal lead 3 and the other metal lead 3 is connected to other lateral surfaces (opposed surfaces) of the heating device 1 and the PTC device 2, respectively. The metal lead 3 provided between the heating device 1 and the PTC device 2 is connected to one end of the cathode terminal 11 of the secondary battery. In addition, the other metal lead 3 provided at the other lateral surface (opposed surface) of the heating device 1 is connected to the anode terminal 12 of the secondary battery so that the voltage sensitive heating device 1 is connected between the cathode terminal 11 and the anode terminal 12 of the secondary battery in a row. In addition, since the metal lead 3 provided at the other lateral surface (opposed surface) of the PTC device 2 is connected to the other end of the cathode terminal 11 of the secondary battery, the PTC device 2 is connected to the middle part of the cathode 11 of the secondary battery in series.

FIG. 6B is a schematic view illustrating the safety device shown in FIG. 6A, in which an erosion/water resistant material 4 is coated around the safety device. In this case, the heating device physically makes contact with the PTC device in the erosion/water resistant material 4.

Figure 6:
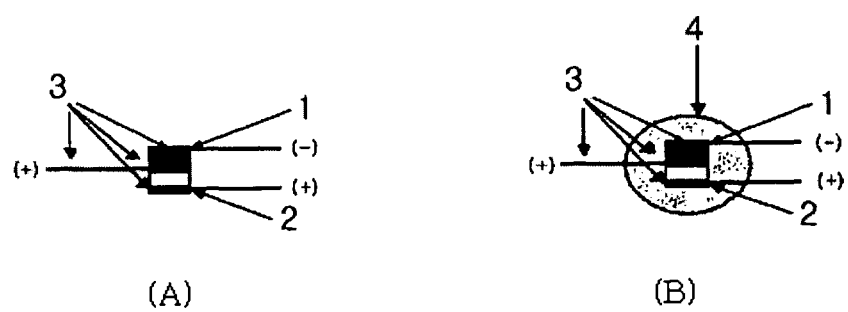
FIGS. 6A and 6B are schematic views illustrating the relationship between a safety device and a secondary battery according to another embodiment of the present invention.
Figure 7:
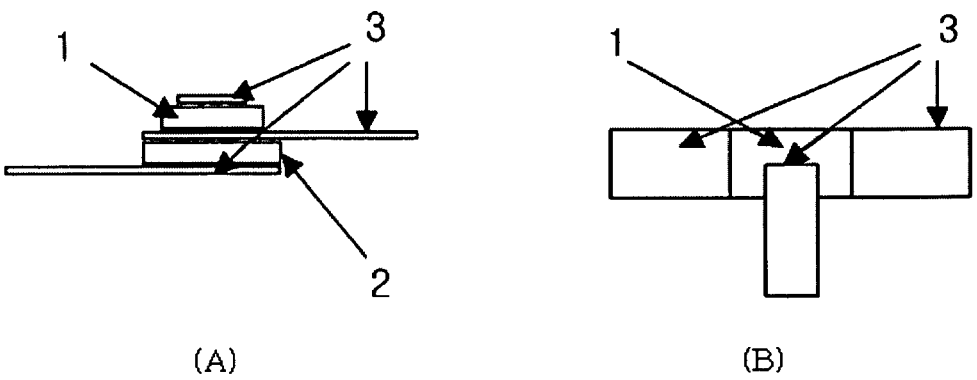
FIGS. 7A and 7B are front and plan views of a safety device shown in FIG. 6, respectively.

FIG. 7A is a front view of the safety device shown in FIG. 6. Referring to FIG. 7A, a bonding surface of the heating device 1 is bonded to a bonding surface of the PTC device 2 through a metal lead 3. In addition, another metal lead 3 is connected to other surfaces of the heating device 1 and the PTC device 2 opposed to the bonding surfaces of the heating device 1 and the PTC device 2. FIG. 7B is a plan view of the safety device shown in FIG. 6. Referring to FIG. 7B, the heating device 1 is connected to the cathode terminal 11 of the secondary battery through the metal lead 3 connected to a left side of the heating device 1 and is connected to the anode terminal 12 of the secondary battery through the metal lead 3 connected to an upper surface of the heating device 1 in the downward direction so that the heating device 1 can be connected between two terminals of the secondary battery in a row. Although it is not illustrated in FIG. 7B, the PTC device 2 is connected to the middle part of the cathode terminal of the secondary battery in series through two metal leads connected to left and right sides of PTC device 2.

Figure 8:
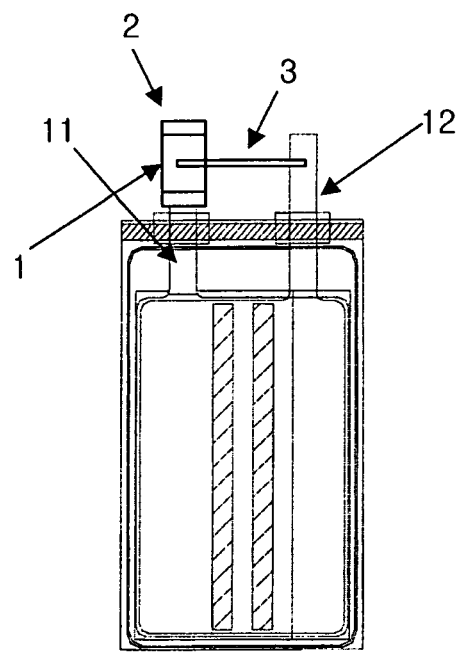
FIG. 8 is a schematic view illustrating a safety device shown in FIG. 6 coupled with a polymer battery.

FIG. 8 is a schematic view illustrating the safety device coupled with a polymer battery, which uses a pouch case, according to the present invention. Referring to FIG. 8, the PTC device 2 is connected to the middle part of the cathode terminal 11 and the heating device 1 is connected to the anode terminal 12 through the metal lead 3 provided at the other surface of the heating device 1 bonded to the PTC device 2. Thus, the heating device 1 is connected between the cathode terminal 11 and the anode terminal 12 of the secondary battery in a row and the PTC device is connected to the middle part of the cathode terminal 11 of the secondary battery in series.

Figure 9:
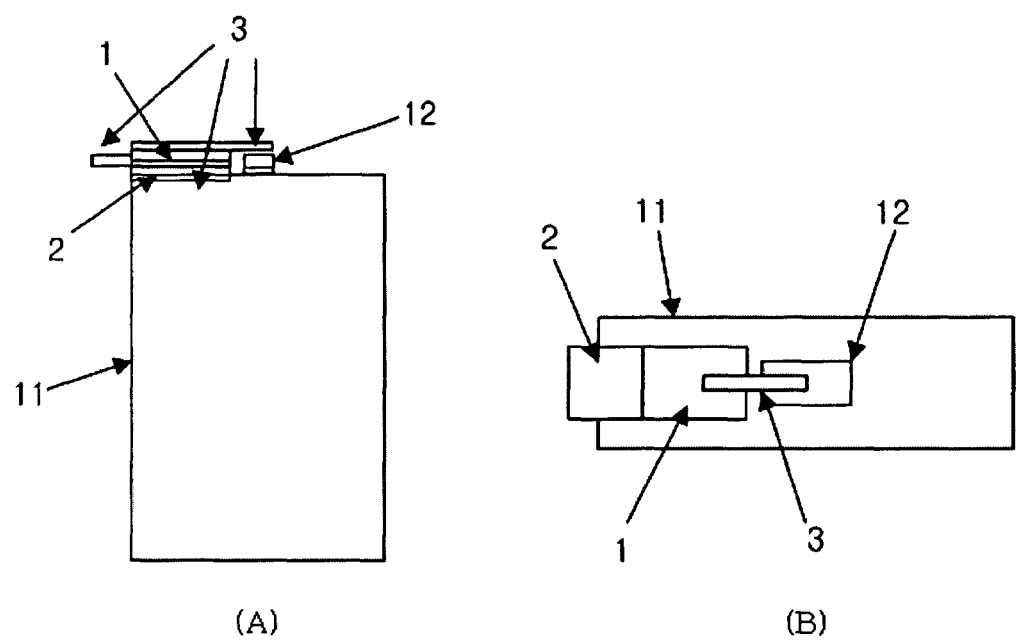
FIGS. 9A and 9B are front and plan views of a safety device shown in FIG. 6 coupled with a square type secondary battery, respectively.

FIG. 9A is a front view of the safety device coupled with a square type secondary battery according to the present invention and FIG. 9B is a plan view of the safety device coupled with the square type secondary battery according to the present invention. Since the square type secondary battery has a battery can coated with a conductive material, such as aluminum or an aluminum alloy, the body of the square type secondary battery may serve as a cathode terminal. In addition, an anode terminal protrudes upward from the upper end of the square type secondary battery. In this case, the bonding surface of the heating device 1 is connected to the PTC device 2 and the cathode terminal 11 of the square type secondary battery through the metal lead 3 provided at the bonding surface of the heating device 1 and the other surface of the heating device 1 opposed to the bonding surface is connected to the anode terminal 12 through another metal lead 3. In addition, one end of the PTC device 2 is connected to the battery body through the metal lead 3 and the other end of the PTC device 2 forming the bonding surface with regard to the heating device 1 is connected to the battery body serving as the cathode terminal.

The safety device of the present invention can be installed in various places of the secondary battery, such as an inner portion or an outer portion of the battery case, a protective circuit module, or a printed circuit board (PCB).

As described above, the safety device according to the present invention can protect the secondary battery from the overcharge, over-voltage, over-current and over-heat.

In addition, according to the present invention, the temperature sensitive device is operated by means of heat generated from the voltage sensitive heating device, which generates the heat when a voltage difference between both ends thereof reaches a predetermined voltage level (e.g., the overcharge voltage), so that the current is shut off before the secondary battery is subject to the over-heat, thereby preventing the secondary battery from being damaged or overcharged.

Furthermore, the present invention employs the voltage sensitive heating device capable of generating heat before the breakdown voltage to operate the temperature sensitive device when the secondary battery is subject to the overcharge, so that the leakage current caused by the voltage sensitive heating device connected to the terminals of the secondary battery in a row can be prevented.

What is claimed is:

1. A safety device consisting of:
   a voltage sensitive heating device including a zener diode or a varistor, configured to generate heat when a voltage difference between both ends thereof exceeds a predetermined voltage level; and
   a temperature sensitive device including a positive temperature coefficient (PTC) device or a bimetal, having a reversible current ON/OFF function according to a temperature, wherein a lateral surface of the voltage sensitive heating device is coupled with a lateral surface of the temperature sensitive device such that the temperature sensitive device detects the heat generated from the voltage sensitive heating device and the temperature sensitive device is operated by the heat generated from the voltage sensitive heating device upon reaching an operating temperature;
   wherein the voltage sensitive heating device is connected to a cathode and an anode of a secondary battery in parallel;
   wherein the temperature sensitive device is connected to the cathode or the anode of the secondary battery in series;
   wherein a breakdown voltage of the voltage sensitive heating device is at least 15% higher than the predetermined voltage, the predetermined voltage being approximately equal to a full charge voltage of the battery, such that the voltage sensitive heating device has a leakage current value wherein the leakage current value obtained for one hour is less than 0.05% of battery capacity under the full charge voltage; and
   wherein the operating temperature to trigger the operation of the temperature sensitive device is in a range of 50 to 150° C.

2. The safety device as claimed in claim 1, wherein the voltage sensitive device and the temperature sensitive device are reversibly operated.

3. The safety device as claimed in claim 1, wherein the temperature sensitive device shuts off a current when temperature of the temperature sensitive device rises above the operating temperature.

4. The safety device as claimed in claim 1, wherein the voltage sensitive heating device physically makes contact with the temperature sensitive device.

5. The safety device as claimed in claim 1, wherein the voltage sensitive heating device is adapted to generate the heat such that the heat causes the temperature of the temperature sensitive device to increase until it reaches the operating temperature.

6. A secondary battery consisting of:
   safety device, the safety device having a voltage sensitive heating device including a zener diode or a varistor, configured to generate heat when a voltage difference between both ends thereof exceeds a predetermined voltage level and a temperature sensitive device including a positive temperature coefficient (PTC) device or bimetal, having a reversible current ON/OFF function according to a temperature;
   wherein a lateral surface of the voltage sensitive heating device is coupled to a lateral surface of the temperature sensitive device such that the temperature sensitive device detects the heat generated from the voltage sensitive heating device and the temperature sensitive device is operated by the heat generated from the voltage sensitive heating device upon reaching an operating temperature,
   a first end surface of the voltage sensitive heating device is connected to a first metal lead extending to a cathode of the secondary battery and a second end surface of the voltage sensitive heating device is connected to a second metal lead extending to an anode of the secondary battery such that the voltage sensitive heating device is connected to the cathode and the anode of the secondary battery in parallel;

wherein a first end surface of the temperature sensitive device is connected to a third metal lead extending to the cathode of the secondary battery and a second end surface of the temperature sensitive device is connected to a fourth metal lead extending to the cathode such that the temperature sensitive device is connected to the secondary battery in series; and wherein a breakdown voltage of the voltage sensitive heating device is at least 15% higher than the predetermined voltage, the predetermined voltage being approximately equal to a full charge voltage of the battery, such that the voltage sensitive heating device has a leakage current value wherein the leakage current value obtained for one hour is less than 0.05% of battery capacity under the full charge voltage.

7. The secondary battery as claimed in claim 6, wherein the voltage sensitive device and the temperature sensitive device are reversibly operated.

8. The secondary battery as claimed in claim 6, wherein the voltage sensitive heating device physically makes contact with the temperature sensitive device.

9. The secondary battery as claimed in claim 6, wherein the temperature sensitive device shuts off a current when the temperature rises above the operating temperature.

10. The secondary battery as claimed in claim 6, wherein the voltage sensitive heating device is adapted to generate the heat such that the heat causes the temperature of the temperature sensitive device to increase until it reaches the operating temperature.

11. The safety device of claim 1, wherein a surface on the temperature sensitive device that is opposed to the lateral surface that is coupled with the voltage sensitive heating device also contacts a metal lead that communicates with the secondary battery.

12. The secondary battery as claimed in claim 6, wherein the lateral surface of the voltage sensitive heating device contacts the lateral surface of the temperature sensitive device through a metal lead, where opposing surfaces of the metal lead directly contact the lateral surface of the voltage sensitive heating device and the lateral surface of the temperature sensitive heating device respectively, and wherein a surface on the voltage sensitive heating device that is opposed to the lateral surface that directly contacts the metal lead contacts another metal lead that communicates with the secondary battery.

13. The secondary battery as claimed in claim 6, wherein the voltage sensitive heating device is configured to generate heat when the voltage exceeds the predetermined voltage such that the voltage sensitive heating device generates heat that increases temperature of the temperature sensitive device until the temperature sensitive device reaches the operating temperature.

\* \* \* \* \*